US008738316B2

(12) United States Patent
Wang

(10) Patent No.: US 8,738,316 B2
(45) Date of Patent: May 27, 2014

(54) LUMINANCE SENSING SYSTEM AND METHOD AND COMPUTER PROGRAM PRODUCT THEREOF

(75) Inventor: Szu-Hsuan Wang, Kaohsiung (TW)

(73) Assignee: Institute for Information Industry, Taipei (TW)

( * ) Notice: Subject to any disclaimer, the term of this patent is extended or adjusted under 35 U.S.C. 154(b) by 804 days.

(21) Appl. No.: 12/970,581

(22) Filed: Dec. 16, 2010

(65) Prior Publication Data

US 2012/0150485 A1 Jun. 14, 2012

(30) Foreign Application Priority Data

Dec. 10, 2010 (TW) ................................ 99143265 A

(51) Int. Cl.
G01J 1/42 (2006.01)
G01J 1/00 (2006.01)
G06F 17/40 (2006.01)
G06F 19/00 (2011.01)

(52) U.S. Cl.
CPC .... G01J 1/42 (2013.01); G01J 1/00 (2013.01); G06F 17/40 (2013.01); G06F 19/00 (2013.01)
USPC ................ 702/127; 73/170.27; 250/214 AL; 250/491.1; 356/213; 702/1; 702/187

(58) Field of Classification Search
CPC .......... D02D 7/00; D02D 9/00; D02D 21/00; G01J 1/00; G01J 1/10; G01J 1/16; G01J 1/1626; G01J 1/20; G01J 1/28; G01J 1/42; G01J 1/4204; G01J 1/4228; G01J 1/58; G01J 2001/00; G01J 2001/10; G01J 2001/16; G01J 2001/1626; G01J 2001/20; G01J 2001/42; G01J 2001/4228; G01J 2001/4266; G01W 1/00; G01W 1/12; G06F 11/00; G06F 11/30; G06F 11/32; G06F 11/34; G06F 17/00; G06F 17/40; G06F 19/00

USPC ................... 73/170.16, 170.27, 432.1, 865.8; 126/569, 572, 573, 574, 578, 600, 601; 250/200, 201.1, 203.1, 203.3, 203.4, 250/203.6, 206, 214 R, 214 AL, 215, 491.1; 356/138, 139.01, 139.03, 139.04, 213, 356/218; 382/100, 103; 700/90; 702/1, 2, 3, 702/5, 127, 150, 151, 152, 153, 154, 187, 702/189; 708/100, 105, 200
IPC .................. G01D 7/00,9/00, 21/00; G01J 1/00, G01J 1/10, 1/16, 1/1626, 1/20, 1/28, 1/42, G01J 1/4204, 1/4228, 1/58, 2001/00, 2001/10, G01J 2001/16, 2001/1626, 2001/20, 2001/42, G01J 2001/4228, 2001/4266; G01W 1/00, G01W 1/12; G06F 11/00, 11/30, 11/32, 11/34, G06F 17/00, 17/40, 19/00
See application file for complete search history.

(56) References Cited

U.S. PATENT DOCUMENTS 2,036,286 A * 4/1936 Long ............................. 315/156
2,199,394 A * 5/1940 Leon ............................. 250/205

(Continued)

Primary Examiner — Edward Cosimano
(74) Attorney, Agent, or Firm — Muncy, Geissler, Olds & Lowe, P.C.

(57) ABSTRACT

A luminance sensing system and method and a computer program product thereof are provided. The system includes: a first luminance sensing unit, arranged at a first position, and used for sensing a light ray luminance at the first position to generate a first illumination value; a second luminance sensing unit, arranged at a second position, having a displacement unit, and used for sensing a light ray luminance at the second position to generate a second illumination value; and a computing unit, electrically connected to the first luminance sensing unit, the displacement unit, and the second luminance sensing unit, and used for acquiring the first illumination value and the second illumination value, acquiring luminance range information by using the first illumination value. When the second illumination value does not conform to the luminance range information, the computing unit controls the displacement unit to move the second luminance sensing unit.

15 Claims, 10 Drawing Sheets

(56) References Cited

U.S. PATENT DOCUMENTS

| | | | | |
|---|---|---|---|---|
| 2,947,872 A | * | 8/1960 | Carbonara et al. | 250/203.6 |
| 2,966,823 A | * | 1/1961 | Trimble | 250/203.1 |
| 2,967,981 A | * | 1/1961 | Wise | 361/173 |
| 3,064,131 A | * | 11/1962 | Brown | 250/203.4 |
| 3,177,367 A | * | 4/1965 | Brown | 250/237 R |
| 3,297,395 A | * | 1/1967 | Sahag | 359/196.1 |
| 3,308,299 A | * | 3/1967 | Sahag | 250/235 |
| 3,329,819 A | * | 7/1967 | Chapman et al. | 250/205 |
| 3,389,260 A | * | 6/1968 | Fontana | 250/203.4 |
| 3,500,456 A | * | 3/1970 | Ross | 315/149 |
| 4,449,074 A | * | 5/1984 | Luchaco | 315/159 |
| 5,317,145 A | * | 5/1994 | Corio | 250/203.4 |
| 7,111,952 B2 | * | 9/2006 | Veskovic | 362/1 |
| 7,566,137 B2 | * | 7/2009 | Veskovic | 362/1 |
| 7,588,067 B2 | * | 9/2009 | Veskovic | 160/5 |
| 7,950,827 B2 | * | 5/2011 | Veskovic | 362/276 |
| 7,963,675 B2 | * | 6/2011 | Veskovic | 362/276 |
| 8,061,080 B2 | * | 11/2011 | Loebl et al. | 47/58.1 LS |
| 8,197,093 B2 | * | 6/2012 | Veskovic | 362/276 |
| 2005/0110416 A1 | * | 5/2005 | Veskovic | 315/149 |
| 2007/0211446 A1 | * | 9/2007 | Veskovic | 362/1 |
| 2007/0211447 A1 | * | 9/2007 | Veskovic | 362/1 |
| 2009/0301672 A1 | * | 12/2009 | Veskovic | 160/405 |
| 2010/0006241 A1 | * | 1/2010 | Veskovic | 160/405 |
| 2010/0076620 A1 | * | 3/2010 | Loebl et al. | 700/306 |
| 2011/0254453 A1 | * | 10/2011 | Veskovic | 315/152 |

* cited by examiner

LUMINANCE SENSING SYSTEM AND METHOD AND COMPUTER PROGRAM PRODUCT THEREOF

CROSS-REFERENCE TO RELATED APPLICATION

This application claims the benefit of Taiwan Patent Application No. 099143265, filed on Dec. 10, 2010, which is hereby incorporated by reference for all purposes as if fully set forth herein.

BACKGROUND OF THE INVENTION

1. Field of Invention

The present invention relates to a luminance sensing system and method and a computer program product thereof, and more particularly to a luminance sensing system and method and a computer program product thereof which can move a light luminance sensor to avoid shadow.

2. Related Art

At present, a light luminance sensing device or a luminometer is generally adopted to measure a light luminance directly. However, in some specific places such as indoors, greenhouses, botanical gardens, forests, and pavilions, various shields like beam columns, objects, and trees exist, and as the sun moves with time and seasons, the shadows generated by the shields also move accordingly; as a result, since the light luminance sensing device is often installed at a fixed position, measurement troubles may occur or only a partial measurement can be carried out. More particularly, in a greenhouse of plants, an actual indoor illumination value needs to be measured for the plants. Currently, the major indoor light luminance sensing methods are as follows. (1) Manual measurement: a worker carries a mini-type luminometer to measure indoors periodically, so as to avoid shadows through manual judgment. (2) Outdoor luminance sensors/luminometers are arranged outside to sense an outdoor light luminance, and an indoor light luminance inside the greenhouse is converted with an empirical value or a specific operational mode. (3) As shown in FIG. 1, a luminometer is arranged at a fixed position inside the greenhouse, so as to detect the indoor luminance all day long for reference.

However, in the prior art, the manual measurement mode consumes considerable man power and work time, and in a case that long time detection and measurement of the light luminance are needed, such a mode consumes great man power and makes long-term systematic recording very difficult, and thus is rather unpractical. Next, for the mode of converting the outdoor light luminance into the indoor light luminance, as many conversion modes and rules exist and different indoor light-transmissive elements are made of different materials, errors occur to the light transmittance, so that the computed indoor light luminance is inaccurate and has quite low reliability. In addition, when the sensed outdoor light luminance is relatively low due to outdoor weather changes (such as cloudy days and rainy days), a supplementary light source may be turned on indoors, causing even larger errors. Moreover, FIG. 1 depicts a greenhouse as an example, and if a luminometer 14 is arranged at a fixed position inside the greenhouse 11, the luminometer 14 is capable of sensing the indoor light luminance all day long which is to be recorded by a computing unit 15. However, in fact, a difference between an illumination value when the luminometer 14 is shielded by a shadow 13 of a beam column 12 and a illumination value when the luminometer 14 is not shielded by the shadow 13 of the beam column 12 is too large, so the records at this time are discarded by the computing unit 15, and actual weather changes are unable to be reflected. As the luminometer 14 is for sure shielded by the shadow 13 of the beam column 12 for a long time, a large number of values are discarded by the computing unit 15, and thus the recorded illumination values have a low reliability for reference.

Therefore, the manufacturers should consider how to provide a luminance sensing system that saves man power resource and is free of the influences of shadows.

SUMMARY OF THE INVENTION

The present invention is directed to solve the problem in the prior art that the illumination value cannot be correctly sensed all day long in the case that the luminance sensing device/luminometer is sometimes shielded by shadows. Therefore, the present invention provides a luminance sensing system and method, in which one of two luminance sensing units is capable of avoiding shadows automatically according to illumination values detected by the two luminance sensing units and a displacement unit, so as to correctly sense a illumination value.

In order to solve the above problem, the present invention provides a luminance sensing system, which comprises a first luminance sensing unit arranged at a first position, a second luminance sensing unit arranged at a second position, and a computing unit.

The first luminance sensing unit is used for sensing a light ray luminance at the first position to generate a first illumination value. The second luminance sensing unit has a displacement unit and is used for sensing a light ray luminance at the second position to generate a second illumination value. The computing unit is electrically connected to the first luminance sensing unit, the displacement unit, and the second luminance sensing unit, and used for acquiring the first illumination value and the second illumination value, acquiring luminance range information by using the first illumination value, and determining whether the second illumination value conforms to the luminance range information, wherein the computing unit controls the displacement unit to move the second luminance sensing unit when the second illumination value does not conform to the luminance range information.

In order to solve the above problem, the present invention provides a luminance sensing method applicable for a first luminance sensing unit arranged at a first position and a second luminance sensing unit arranged at a second position. The method comprises: sensing, by the first luminance sensing unit, to generate a first illumination value; acquiring, by a computing unit, luminance range information by using the first illumination value; sensing, by the second luminance sensing unit, to generate a second illumination value; analyzing, by the computing unit, whether the second illumination value conforms to the luminance range information; and when the second illumination value does not conform to the luminance range information, moving, by the computing unit, the second luminance sensing unit with a displacement unit.

The present invention further provides a computer program product to be read by a computing unit/electronic apparatus to perform the luminance sensing method. The method is applicable for a first luminance sensing unit arranged at a first position and a second luminance sensing unit arranged at a second position, and the process of the method is mentioned above, the description of which is omitted here.

Firstly, the characteristic of the present invention is that according to the illumination values detected by the two luminance sensing units, it is analyzed whether the illumination value of one of the luminance sensing units conforms to the luminance range information; if not, it can be judged that the luminance sensing unit is shielded by a shadow, so that the luminance sensing unit is moved with the displacement unit to keep the luminance sensing unit at a position that is not shielded by the shadow. For example, inside a greenhouse, beam columns or other objects often generate shielding shadows, and through the system and method of the present invention, an indoor luminance sensing unit/luminometer can be kept at an area with sun radiation, so as to assist the recording of the luminance and period of the light in actual contact with the plants, increase the correctness of the records and growth chart, and enhance the reliability of data analysis based on the records, thus enabling the purchasers to learn about the real growth situation of the crops, and facilitating the researchers to improve the cultivation method.

Secondly, through the characteristic that one luminance sensing unit in the system has a movable displacement unit, the system can automatically move the second luminance sensing unit to a position that is not shielded, and record the value detected by the second luminance sensing unit, so that the management personnel do not need to go to the site frequently to measure the actual indoor luminance, thus effectively saving the man power and work cost.

Thirdly, through the light luminance perception at different indoor positions/places, relatively correct indoor illumination values can be measured, and the present invention can further judge whether to activate relevant adjustment and control apparatuses such as switches of automatic windows, and switches of lights, switches of blinds, switches of air conditioners, and switches of roof shading units of buildings at the planting site, so as to facilitate automatic optimized management of indoor environment.

Fourthly, the system can cooperatively record a position and an irradiation angle of the sun and perform pre-control of the devices in combination with the records, so that relevant apparatuses can be ready before the luminance perception operation, thus enhancing the reliability of the records, and at the same time reducing the operational load of data, to prolong the service life of the system, the relevant apparatuses, and the hardware and reduce the cost.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The preferred embodiments of the present invention are illustrated in detail below with reference to the accompanying drawings.

Figure 1:
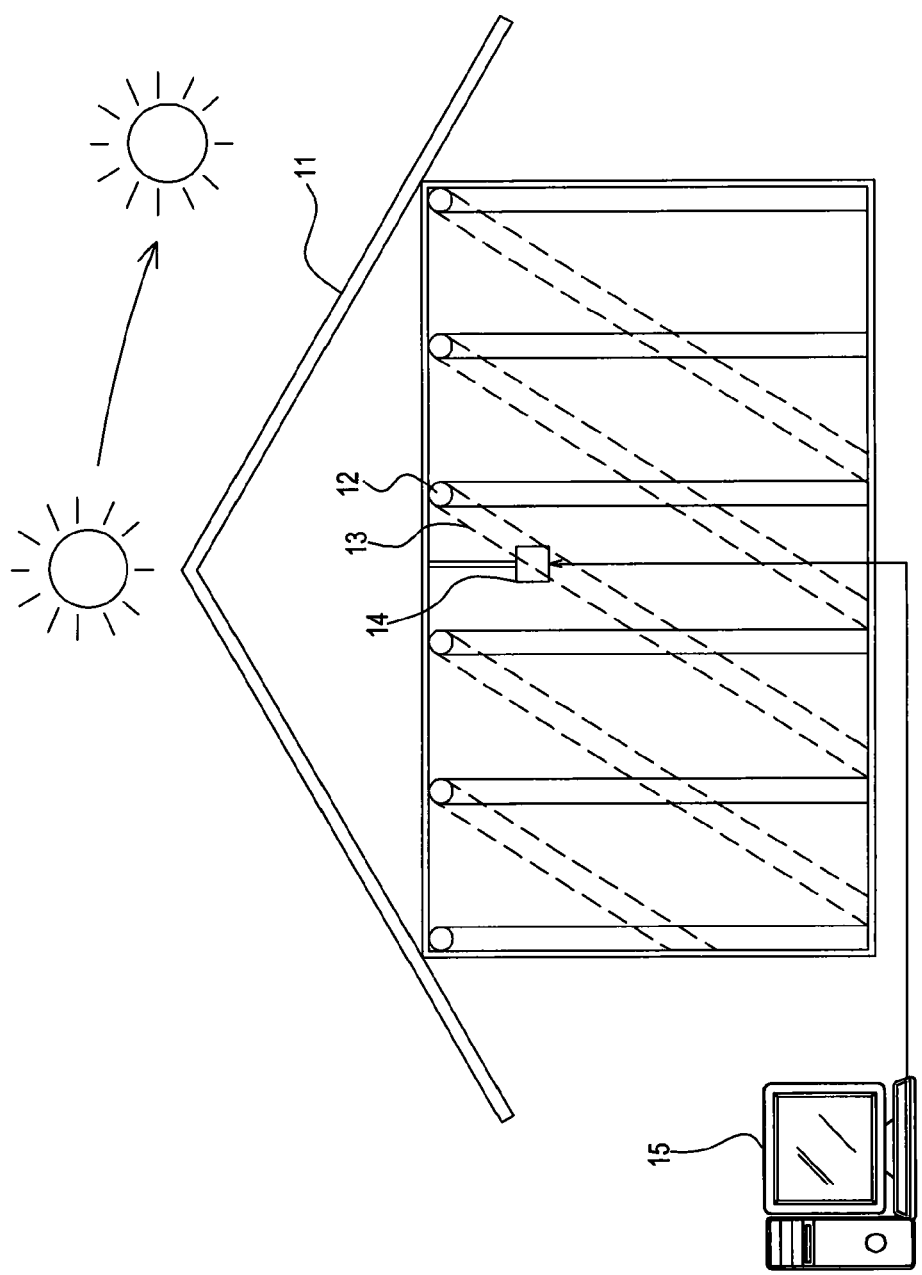
FIG. 1 is a schematic view of configuration of a luminance system in the prior art.
Figure 2:
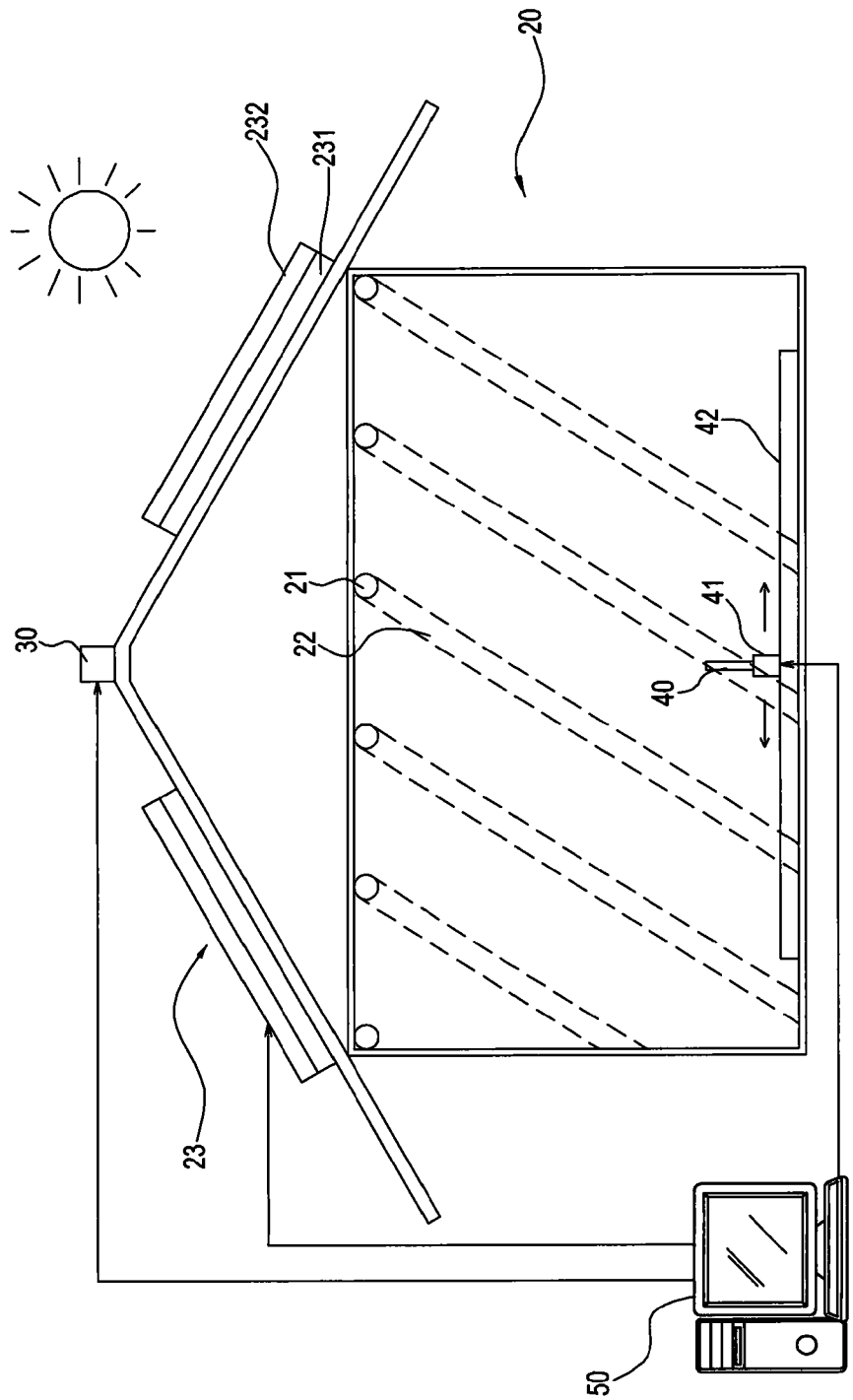
FIG. 2 is a first hardware configuration diagram of a luminance sensing system according to an embodiment of the present invention.
Figure 3A:
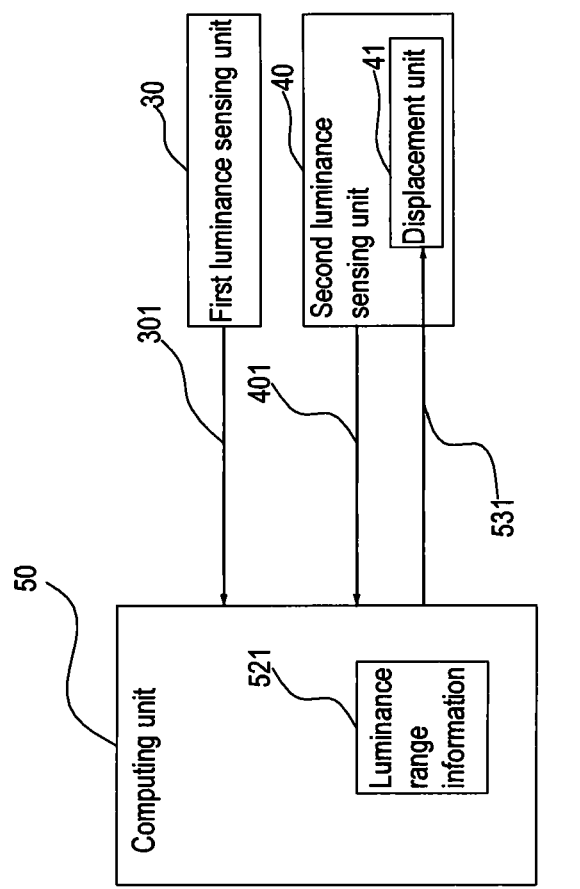
FIG. 3A is a system architecture view of a luminance sensing system according to an embodiment of the present invention.
Figure 3B:
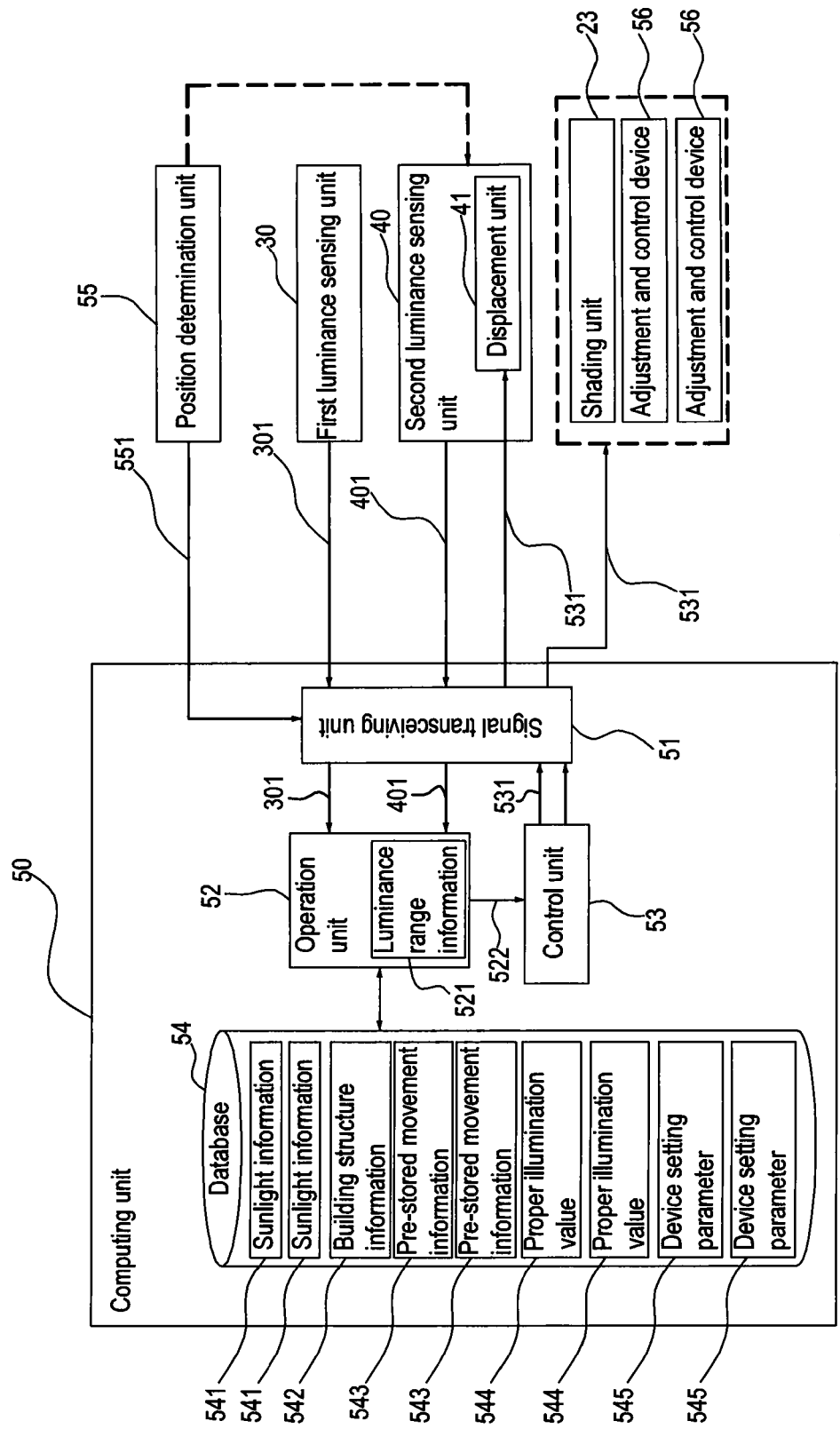
FIG. 3B is a system block diagram of a luminance sensing system according to an embodiment of the present invention.

FIG. 2 is a hardware configuration diagram of a luminance sensing system according to an embodiment of the present invention, FIG. 3A is a system architecture view of a luminance sensing system according to an embodiment of the present invention, and FIG. 3B is a block diagram of detailed elements in a luminance sensing system according to another embodiment of the present invention. The system includes a first luminance sensing unit 30, a second luminance sensing unit 40, and a computing unit 50. In this embodiment, a greenhouse 20 is taken as an example for a building in which the system is arranged, and a beam column 21 is taken as an example for a shield. However, the present invention is not limited thereto, and all the other buildings and shields are applicable. A partial architecture of the greenhouse 20, for example, a roof or a sidewall, is made of a light-transmissive material. More than one shading unit 23 is arranged at a top end of the greenhouse 20. The shading unit 23 can be opened and closed, and has a corresponding light transmittance according to the material, so as to increase the light luminance of the planting site when being opened and decrease the light luminance of the planting site when being closed.

The first luminance sensing unit 30 is arranged at a first position, for which a roof outside the greenhouse 20 is taken as an example. However, the present invention is not limited thereto. The second luminance sensing unit 40 is arranged at a second position, for which a position inside the greenhouse 20 is taken as an example. The second luminance sensing unit 40 includes a displacement unit 41. In some embodiments, the displacement unit 41 may be arranged on a track 42 and controlled to move on the track 42, thereby actuating displacement of the second luminance sensing unit 40. However, the displacement unit 41 may also be a position movement mechanism in direct contact with the ground, and the present invention is not limited to a fixed displacement mechanism in combination with a track.

The computing unit 50 is electrically connected to the first luminance sensing unit 30, the second luminance sensing unit 40, and the displacement unit 41, and may be a personal computer, a notebook computer, a netbook, an industrial computer, a processor, or other devices capable of computation. In some embodiments, the computing unit 50 includes a signal transceiving unit 51, an operation unit 52 (for example, a processor), and a control unit 53.

The first luminance sensing unit 30 is used for sensing a light ray luminance outside the greenhouse 20 to generate a first illumination value 301. The second luminance sensing unit 40 is used for sensing a light ray luminance inside the greenhouse 20 to generate a second illumination value 401.

The signal transceiving unit 51 measures the first illumination value 301 and the second illumination value 401, and forwards the first illumination value 301 and the second illumination value 401 to the operation unit 52. The operation unit 52 computes luminance range information 521 according to the first illumination value 301. An operational expression of the luminance range information 521 is a product of the first illumination value 301, the light transmittance of the material of the greenhouse 20, the light transmittance of the material of each shading unit 23 in a closed status, and an allowable error range value.

For example, two shading units 23 are arranged on the roof of the greenhouse 20, which are an internal light shading net 231 and an external light shading net 232, so that the shading units 23 act in the following modes: (1) both the internal and external light shading nets (231, 232) are closed; (2) the external light shading net 232 is closed, and the internal light shading net 231 is opened; and (3) both the internal and external light shading nets (231, 232) are opened. Therefore, the luminance range information 521 can be computed in the following manners.

(1) When both the internal and external light shading nets (231, 232) are closed, the computation expression is: the first illumination value 301×the light transmittance of the material of the greenhouse 20×the light transmittance of the material of the internal light shading net 231×the light transmittance of the material of the external light shading net 232×the allowable error range value.

(2) When the external light shading net 232 is closed and the internal light shading net 231 is opened, the computation expression is: the first illumination value 301×the light transmittance of the material of the greenhouse 20×the light transmittance of the material of the external light shading net 232×the allowable error range value.

(3) When both the internal and external light shading nets (231, 232) are opened, the computation expression is: the first illumination value 301×the light transmittance of the material of the greenhouse 20×the allowable error range value.

However, the external light shading net 232 and the internal light shading net 231 are electrically connected to the computing unit 50, and the operation unit 52 determines whether to use the light transmittance of the material of the relevant shading unit 23 to compute the luminance range information 521 according to the status of each shading unit 23. Furthermore, the opening/closing of the shading unit 23 may be controlled and managed by the computing unit 50.

Next, at least one of the light transmittance of the material of the greenhouse 20, the light transmittance of the material of each shading unit 23, and the allowable error range value may be pre-stored in the computing unit 50 in a manner of being directly written in an executable program of the operation unit 52, or pre-stored in a database 54 of the computing unit 50 to be read and used by the operation unit 52, or input by a user through an input interface of the computing unit 50.

The operation unit 52 determines whether the second illumination value 401 conforms to the computed luminance range information 521, and informs the control unit 53 of the determination result. When the determination result is that the second illumination value 401 does not conform to the computed luminance range information 521, indicating that the second luminance sensing unit 40 is shielded by a shadow 22 of a building structure inside the greenhouse 20, for which the shadow 22 of the beam column 21 is taken as an example below, the control unit 53 sends a relevant control signal 531 through the signal transceiving unit 51, thereby controlling the displacement unit 41 to move on the track 42, and actuating the second luminance sensing unit 40 to move out of the shadow 22.

However, the mode of controlling the second luminance sensing unit 40 to move includes the following implementations.

(1) The control unit 53 enables the displacement unit 41 to move in an optional direction, and then analyzes whether the second illumination value 401 already conforms to the luminance range information 521. If the second illumination value 401 conforms to the luminance range information 521, the control unit 53 stops the movement of the displacement unit 41; and if still not, the control unit 53 further enables the displacement unit 41 to continue moving in the same direction.

(2) A plurality of pieces of sun light information 541 is stored in the database 54, and each piece of the sun light information 541 includes time (the unit thereof at least includes month, day, hour, minute, and even second), sun position information (the azimuth and angle of elevation of the sun relative to the greenhouse 20), and sun light angle information (the irradiation angle of the sun light ray), that is, at this time point, the information of the position and the angle of the irradiation light ray of the sun. When determining that the displacement unit 41 needs to move, the operation unit 52 finds target sun light information conforming to the corresponding time point from all the sun light information 541, and computes displacement information 522 according to sun position information and sun light angle information of the target sun light information, so as to enable the control unit 53 to control the displacement of the displacement unit 41 according to the displacement information 522.

(3) The database 54 further stores an arrangement direction of a shield in the greenhouse 20 such as the beam column 21 corresponding to the second luminance sensing unit 40 and the building structure information 542. The operation unit 52 computes a range of the shadow 22 of the beam column 21 according to the arrangement direction of the beam column 21 relative to the second luminance sensing unit 40, the building structure information 542, and the target sun light information, so as to further compute a moving direction and distance of the displacement unit 41, and the control unit 53 accordingly controls the displacement unit 41 to move. The computed moving direction and distance of the displacement unit 41 are contained in the displacement information 522. For example, the operation unit 52 queries the database 54 for the possible position and irradiation angle of the sun, the arrangement direction of the beam column 21 relative to the second luminance sensing unit 40, and the building structure information 542. If the sun is located at a 45-degree angle of elevation to the east of the second luminance sensing unit 40, the beam column 21 is arranged in the south-north direction corresponding to the second luminance sensing unit 40 and has a width of 10 cm, the irradiation angle of the sun light is also 45°, the operation unit 52 determines that the width of the shadow 22 of the beam column 21 should be the same as the width of the beam column 21, which is also 10 cm, according to the irradiation angle of the sun light, and the operation unit 52 judges that the displacement unit 41 should move to the east or west and the distance of movement has to exceed a 10 cm wide range of the shadow 22.

(4) A position determination unit 55, for example, a digital compass, is arranged inside the greenhouse 20 and at a fixed position corresponding to a track center, and used for analyzing a position of the displacement unit 41 or the second luminance sensing unit 40 for generating position information 551. Moreover, the digital compass can provide direction information for the computing unit, so as to assist to compute the direction information of the sun, and the operation unit 52 then computes the relevant displacement information 522 according to the target sun light information and the position information 551 (or further, the sun direction information). The displacement information 522 includes at least one of a displacement direction, a displacement distance, a positioning point of the track, and a displacement angle corresponding to the position determination unit 55 of the displacement unit 41.

(5) The operation unit 52 periodically collects position information of the second luminance sensing unit 40, and records the position information corresponding to the sun light information 541 in the database 54, so as to form multiple pieces of pre-stored movement information 543, including directions and distances, angles, and corresponding time points of the movement which are recorded by a computer system. The time of recording the pre-stored movement information 543 can definitely form a cyclic period, for example, a year. In a next cyclic period, the operation unit 52 takes a piece of target pre-stored movement information from all the pre-stored movement information 543 according to a corresponding time point, so as to enable the control unit 53 to control the displacement of the displacement unit 41 according to the target pre-stored movement information. After that, the computing unit 50 performs a luminance sensing operation.

No matter whether the displacement unit 41 is controlled to move, the operation unit 52 analyzes the sun position and the sun light angle according to a final position of the displacement unit 41, and updates the final position of the displacement unit 41, the sun position, and the sun light angle into the target sun light information.

In addition, the database 54 may further store a plurality of proper illumination values 544 and a plurality of device setting parameters 545. When the operation unit 52 analyzes that the second illumination value 401 conforms to the luminance range information 521 but does not conform to any illumination value 544 or any proper illumination value 544 designated by the management personnel, a relevant device setting parameter 545 can be adopted for the control unit 53. The control unit 53 controls a relevant adjustment and control device 56 including the shading units 23 such as indoor lights, windows, air conditioners, and blinds according to the acquired device setting parameter 545, so as to adjust the environment inside the greenhouse 20. The above technologies are already well-known to persons skilled in the art, and the descriptions thereof will not be described herein again.

Figure 4:
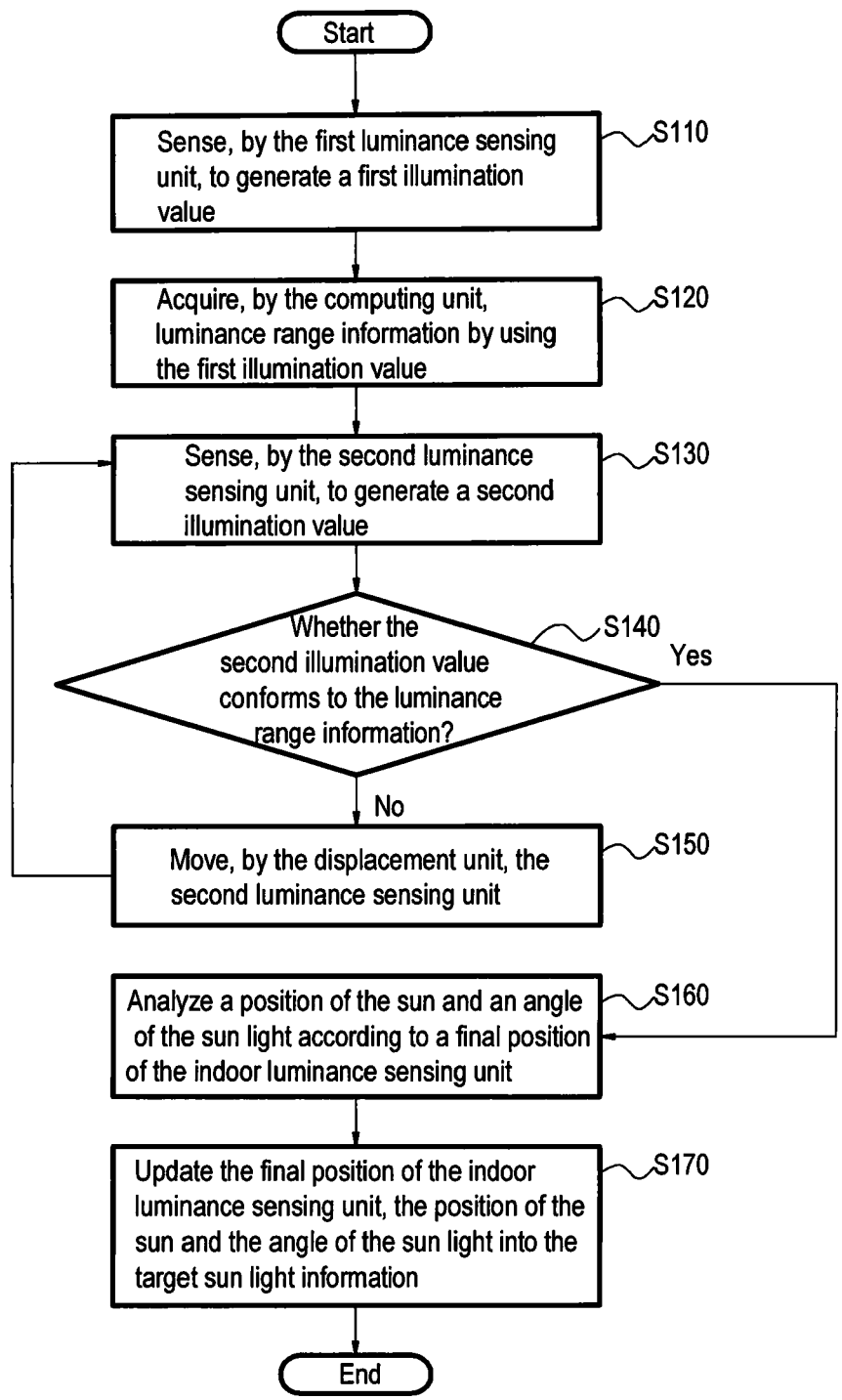
FIG. 4 is a schematic flow chart of a luminance sensing method according to an embodiment of the present invention.

FIG. 4 is a schematic flow chart of a luminance sensing method according to an embodiment of the present invention. Referring to FIG. 2, FIG. 3A and FIG. 3B at the same time for ease of understanding, the method is applicable for a first luminance sensing unit arranged at a first position and a second luminance sensing unit arranged at a second position, and is performed by a computing unit and a displacement unit. The method includes the following steps.

The first luminance sensing unit senses to generate a first illumination value (Step S110). The first luminance sensing unit 30 sends the first illumination value 301 to the computing unit.

The computing unit acquires luminance range information by using the first illumination value (Step S120). An operational expression of the luminance range information 521 is a product of the first illumination value 301, the light transmittance of the material of the greenhouse 20, the light transmittance of the material of each shading unit 23 in a closed status, and an allowable error range value.

The second luminance sensing unit senses to generate a second illumination value (Step S130). The second luminance sensing unit 40 sends the second illumination value 401 to the computing unit.

The computing unit analyzes whether the second illumination value conforms to the luminance range information (Step S140). The computing unit informs the control unit 53 of the determination result.

When the second illumination value 401 does not conform to the luminance range information 521, indicating that the second luminance sensing unit 40 is shielded by the shadow 22 of the building structure inside the greenhouse 20, the control unit 53 receives and sends the relevant control signal 531 and response signal through the signal transceiving unit 51, and moves the second luminance sensing unit with the displacement unit (Step S150). Furthermore, in order to confirm whether the second luminance sensing unit already leaves the shadow 22 after displacement, the sensing is continuously performed to generate the second illumination value, and it is analyzed whether the second illumination value conforms to the luminance range information, that is, Step S130 to Step S140 are repeated. When the second illumination value still does not conform to the luminance range information, Step S150 is continuously performed until the second illumination value 401 conforms to the luminance range information 521.

Figure 5:
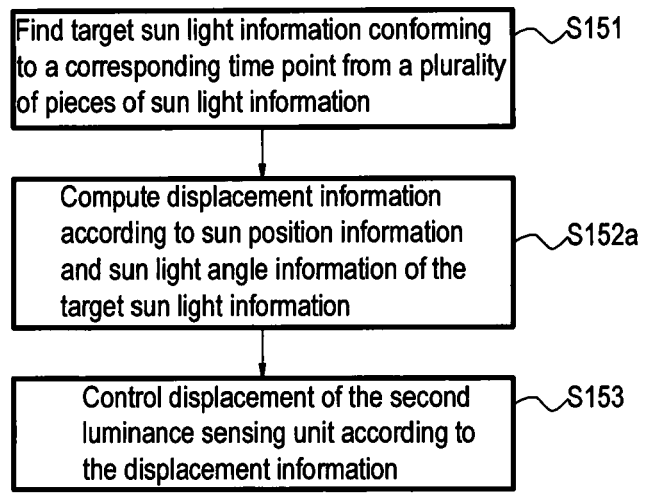
FIG. 5 is a detailed schematic flow chart of a luminance sensing method according to an embodiment of the present invention.

FIG. 5 is a detailed schematic flow chart of a luminance sensing method according to an embodiment of the present invention, in which a process of a mode of controlling the second luminance sensing unit 40 to move is described as follows.

When judging that the second luminance sensing unit 40 should move, the computing unit finds target sun light information conforming to a corresponding time point from a plurality of pieces of sun light information 541 (Step S151). Each piece of the sun light information 541 includes a time, sun position information, and sun light angle information. The unit of the time at least includes month, day, hour, minute, and even second. The sun position information means the azimuth and angle of elevation of the sun relative to the greenhouse 20. The sun light angle information is the irradiation angle of the sun light ray.

The computing unit computes displacement information 522 according to sun position information and sun light angle information of the target sun light information (Step S152a). The control unit 53 controls displacement of the second luminance sensing unit 40 according to the displacement information 522 (Step S153).

Figure 6:
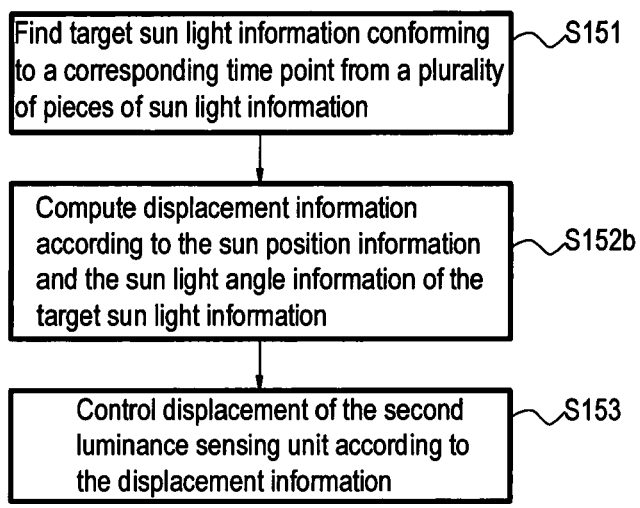
FIG. 6 is a detailed schematic flow chart of a luminance sensing method according to an embodiment of the present invention.

FIG. 6 is a detailed schematic flow chart of a luminance sensing method according to an embodiment of the present invention, which describes a process of another mode of controlling the second luminance sensing unit 40 to move. A difference between FIG. 6 and FIG. 5 lies in Step S152b. In this embodiment, the database 54 stores information of an arrangement direction and a width of a shield (for example, the beam column 21) corresponding to the second luminance sensing unit. The computing unit computes displacement information 522 according to the sun position information and the sun light angle information of the target sun light information and the arrangement direction and width of the shield (for example, the beam column 21) corresponding to the second luminance sensing unit (Step S152b). The displacement information 522 includes at least one of the displacement direction, the displacement distance, the positioning point on the track, and the displacement angle corresponding to the position determination unit 55 of the second luminance sensing unit 40, and the control unit 53 accordingly controls the second luminance sensing unit 40 to move (Step S153).

Figure 7:
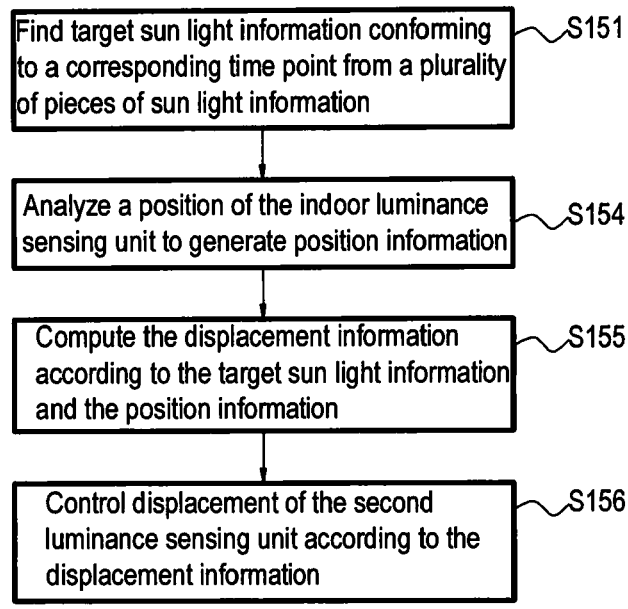
FIG. 7 is a detailed schematic flow chart of a luminance sensing method according to an embodiment of the present invention.

FIG. 7 is a detailed schematic flow chart of a luminance sensing method according to an embodiment of the present invention, which describes a process of another mode of controlling the second luminance sensing unit 40 to move. A difference between this embodiment and the above embodiments lies in that a position determination unit 55, for example, an digital compass, is arranged at a fixed position corresponding to the track center inside the greenhouse 20, and used for analyzing a position of the displacement unit 41 or the second luminance sensing unit 40 for generating position information 551, and further, assisting to compute the direction information of the sun. The method is described as follows.

When judging that the second luminance sensing unit 40 should move, the computing unit finds target sun light information conforming to a corresponding time point from a plurality of pieces of sun light information 541 (Step S151). The position determination unit 55 analyzes a position of the second luminance sensing unit 40 for generating position information 551 (Step S154). The computing unit further computes the displacement information 522 according to the target sun light information and the position information 551 (Step S155). The control unit 53 then controls displacement of the second luminance sensing unit 40 according to the displacement information 522 (Step S156).

Referring to FIG. 4 again, when the second illumination value conforms to the luminance range information, the computing unit analyzes a position of the sun and an angle of the sun light according to a final position of the second luminance sensing unit 40 (Step S160) and updates the final position of the second luminance sensing unit 40, the position of the sun, and the angle of the sun light into the target sun light information (Step S170).

Figure 8:
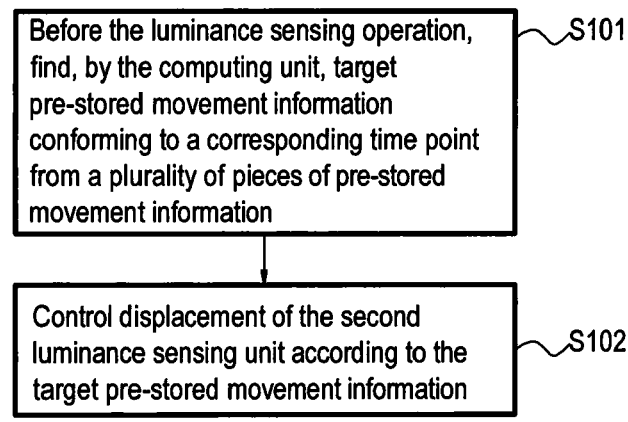
FIG. 8 is a schematic flow chart of pre-operation of a luminance sensing method according to an embodiment of the present invention.

FIG. 8 is a schematic flow chart of pre-operation of a luminance sensing method according to an embodiment of the present invention. As described above, the computing unit periodically collects position information of the second luminance sensing unit 40, and records the position information corresponding to the sun light information 541 in the database 54, so as to form a plurality of pieces of pre-stored movement information, and the recording time forms a cyclic period.

Before the luminance sensing operation, the computing unit finds target pre-stored movement information conforming to a corresponding time point from a plurality of pieces of pre-stored movement information 543 (Step S101). Each piece of the pre-stored movement information 543 includes at least one of the displacement direction, the displacement distance, the positioning point on the track, and the displacement angle corresponding to the position determination unit 55 of the second luminance sensing unit 40.

The control unit 53 controls displacement of the second luminance sensing unit 40 according to the target pre-stored movement information (Step S102). After that, the computing unit 50 performs subsequent processes.

Figure 9:
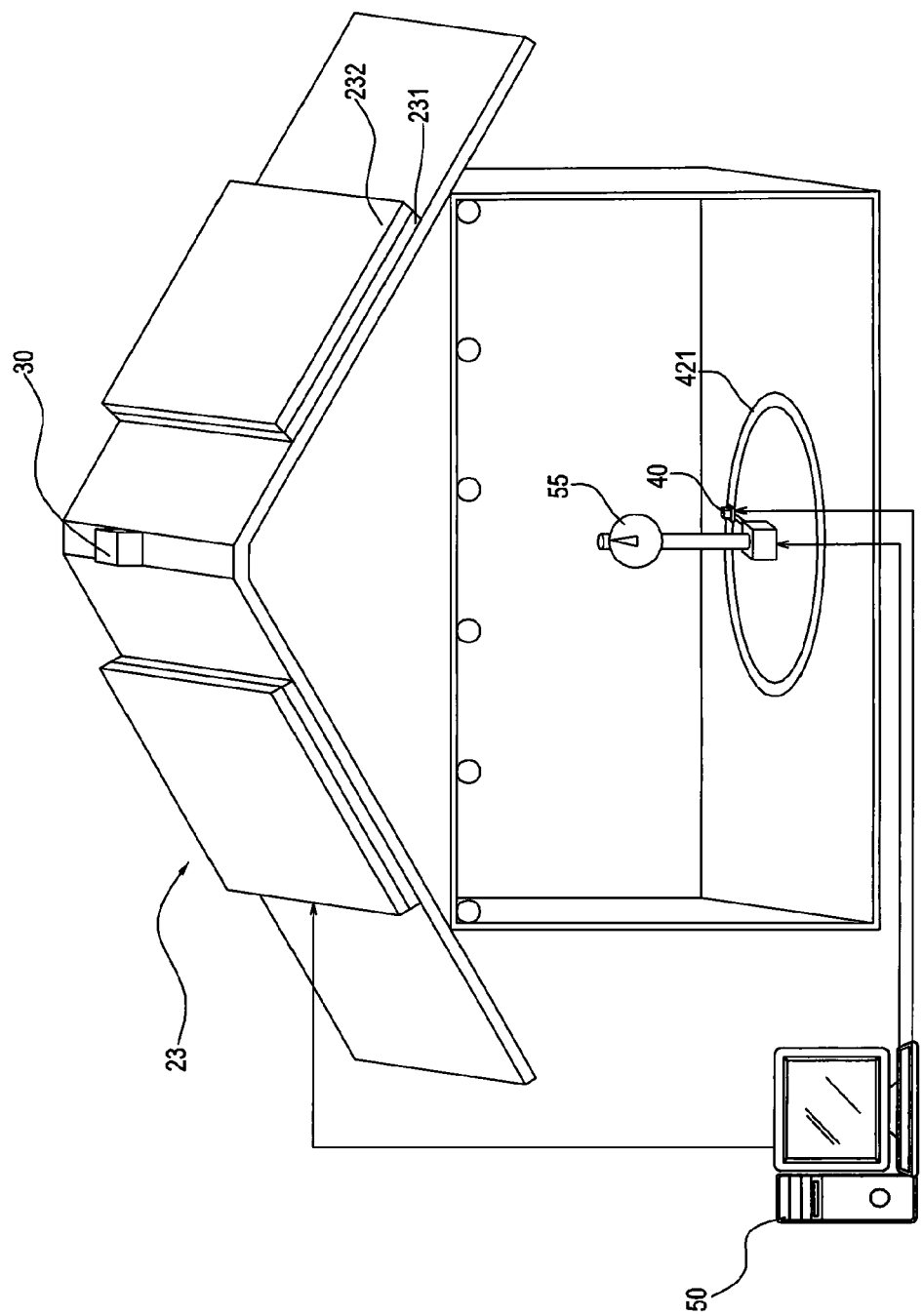
FIG. 9 is a second hardware configuration diagram of a luminance sensing system according to an embodiment of the present invention.

FIG. 9 is a second hardware configuration diagram of a luminance sensing system according to an embodiment of the present invention. In this embodiment, the track is a round track 421, and a digital compass is arranged at a center of the track. The movement of the second luminance sensing unit 40 is exemplified below.

It is assumed that the computing unit analyzes that the second illumination value 401 does not conform to the luminance range information 521, indicating that the second luminance sensing unit 40 is shielded by the shadow 22. In this case, the computing unit computes a range of the shadow 22 of the beam column 21 according to an arrangement direction of the shield corresponding to the second luminance sensing unit, the building structure information, and the target sun light information, so as to further compute a moving direction and distance of the displacement unit 41, and the control unit 53 accordingly controls the displacement unit 41 to move.

In an example, the computing unit 50 acquires from the database 54 that the sun is located at a 45-degree angle of elevation to the east of the second luminance sensing unit 40, the arrangement direction of the shield, that is, the beam column 21, corresponding to the second luminance sensing unit is south-north and the width thereof is 10 cm, and the irradiation angle of the sun light is also 45°. The computing unit 50 judges that the width of the shadow 22 of the beam column 21 should be the same as the width of the beam column 21 according to the irradiation angle of the sun light, which is also 10 cm.

It is assumed that the round track 421 has a diameter of 15 cm, and the displacement angle of the displacement unit 41 relative to the position determination unit 55 is to move 60° north by west.

In another example, the computing unit acquires from the database 54 that the sun is located at a 75-degree angle of elevation to the east of the second luminance sensing unit 40, the arrangement direction of the beam column 21 relative to the second luminance sensing unit is south-north and the width thereof is 10 cm, and the irradiation angle of the sun light is 75°. The computing unit judges that the width of the shadow 22 of the beam column 21 should be smaller than the width of the beam column 21 according to the irradiation angle of the sun light, which is assumed to be 7 cm.

At this time, the displacement angle of the displacement unit 41 relative to the position determination unit 55 is to move 45° north by west.

Figure 10:
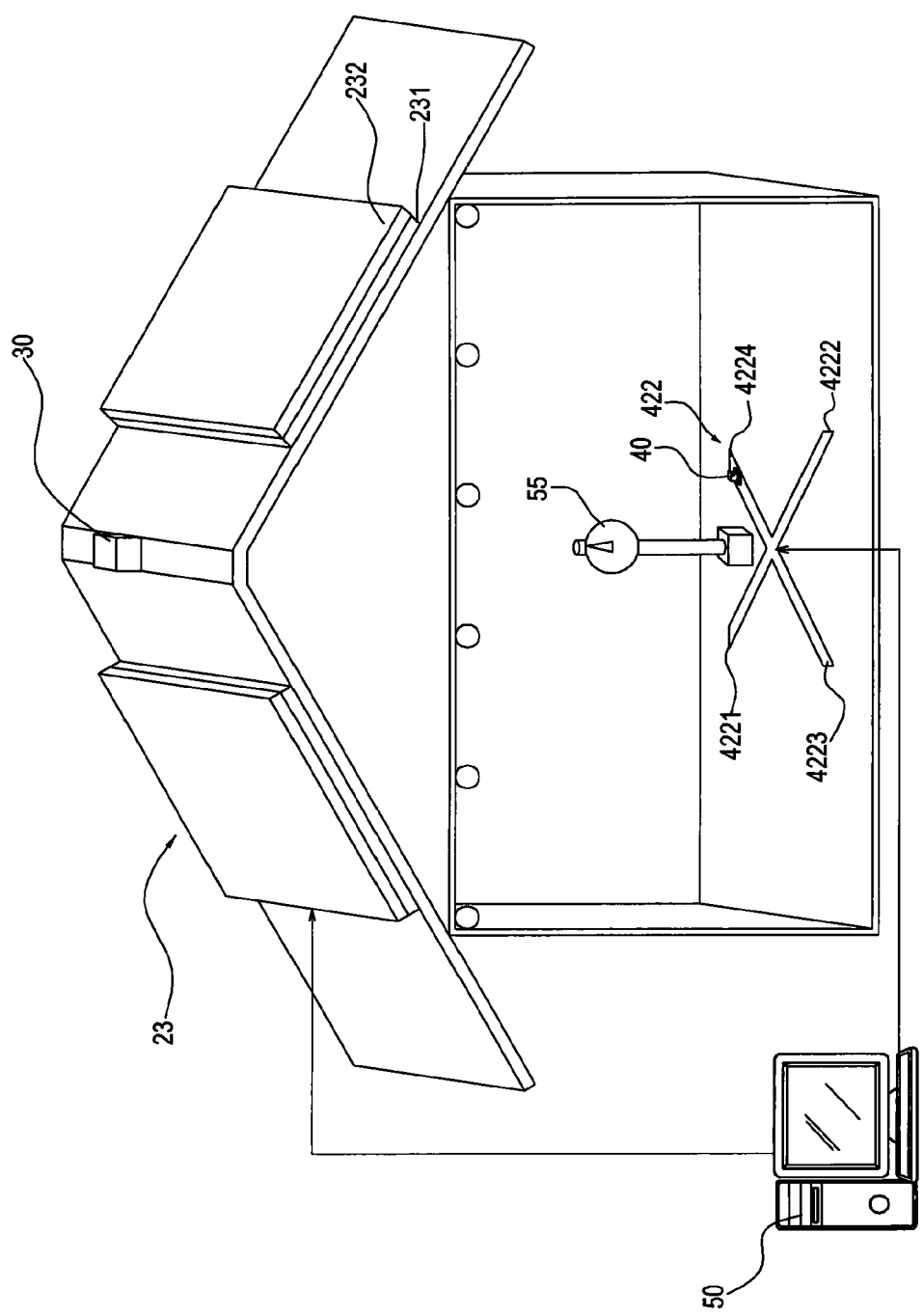
FIG. 10 is a third hardware configuration diagram of a luminance sensing system according to an embodiment of the present invention.

FIG. 10 is a third hardware configuration diagram of a luminance sensing system according to an embodiment of the present invention, and in this embodiment, the track is an X-shaped track 422. Taking a cross shape as an example, the track 422 includes a upper branch 4221, a lower branch 4222, a left branch 4223, and a right branch 4224. An digital compass is already arranged at a center of the track. Here, the movement of the second luminance sensing unit 40 is exemplified below.

It is assumed that the computing unit 50 acquires from the database 54 that the sun is located at a 45-degree angle of elevation to the east of the second luminance sensing unit 40, the arrangement direction of the beam column 21 relative to the second luminance sensing unit is south-north and the width thereof is 10 cm, and the irradiation angle of the sun light is also 45°. The computing unit 50 judges that the width of the shadow 22 of the beam column 21 should be the same as the width of the beam column 21 according to the irradiation angle of the sun light, which is also 10 cm. The computing unit computes that the displacement angle of the displacement unit 41 corresponding to the position determination unit 55 is to move 10 cm to the left branch.

In another example, the computing unit 50 acquires from the database 54 that the sun is located at a 75-degree angle of elevation to the east of the second luminance sensing unit 40, and the arrangement direction of the beam column 21 is south-north and the width thereof is 10 cm, and the irradiation angle of the sun light is 75°. The computing unit 50 judges that the width of the shadow 22 of the beam column 21 should be smaller than the width of the beam column 21 according to the irradiation angle of the sun light, which is assumed to be 7 cm. At this time, the computing unit computes that the displacement angle of the displacement unit corresponding to the position determination unit 55 is to move 7 cm to the left branch.

Figure 11:
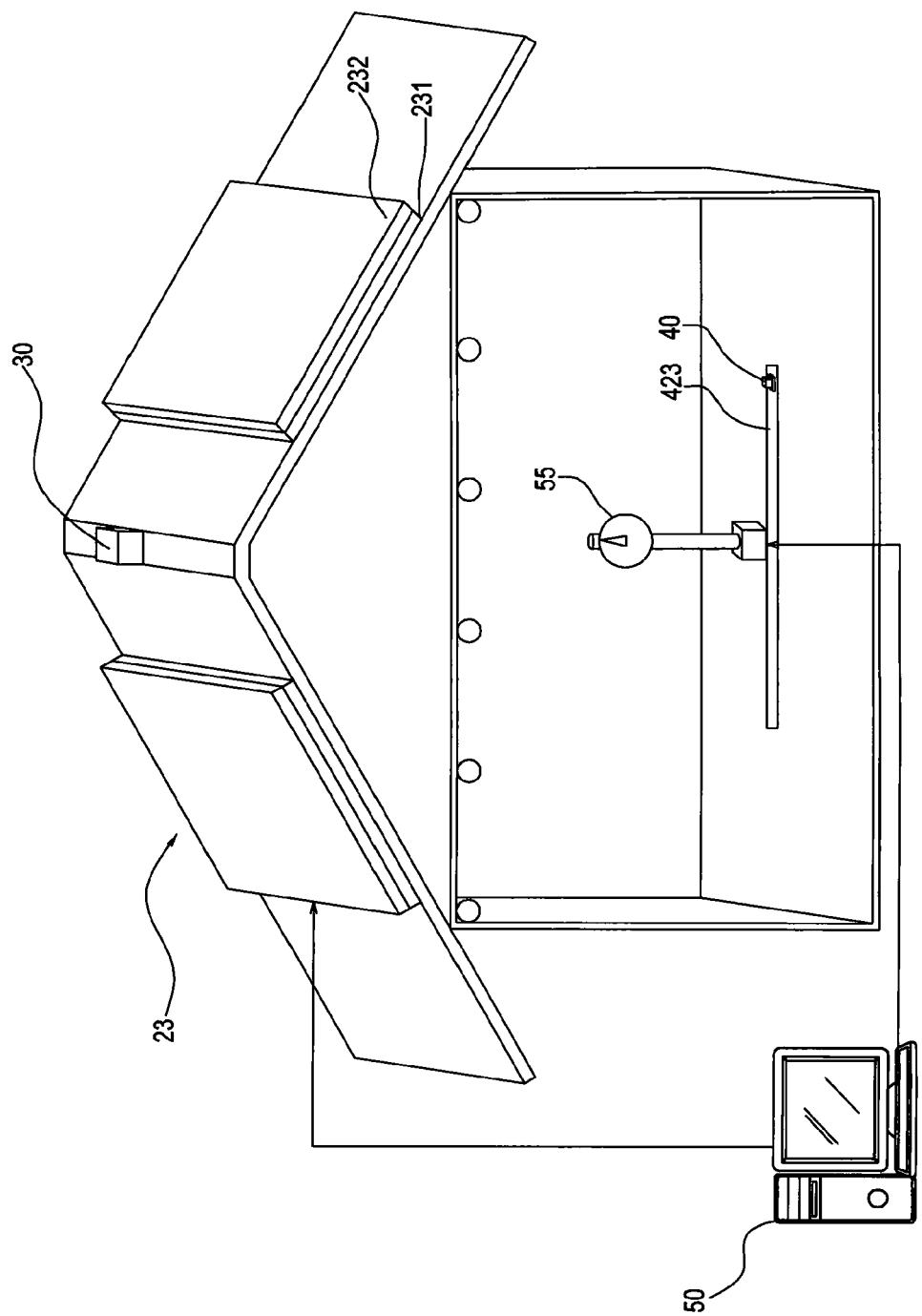
FIG. 11 is a fourth hardware configuration diagram of a luminance sensing system according to an embodiment of the present invention.

FIG. 11 is a fourth hardware configuration diagram of a luminance sensing system according to an embodiment of the present invention. In this embodiment, the track is a straight track 423, and a digital compass is arranged at a center of the track. The movement of the second luminance sensing unit 40 is exemplified below.

It is assumed that the computing unit 50 acquires from the database 54 that the sun is located at a 45-degree angle of elevation to the east of the second luminance sensing unit 40, the arrangement direction of the beam column 21 is south-north and the width thereof is 10 cm, and the irradiation angle of the sun light is also 45°. The computing unit 50 judges that the width of the shadow 22 of the beam column 21 should be the same as the width of the beam column 21 according to the irradiation angle of the sun light, which is also 10 cm. The computing unit computes that the displacement angle of the displacement unit corresponding to the position determination unit 55 is to move 10 cm to the left.

In another example, the computing unit 50 acquires from the database 54 that the sun is located at a 75-degree angle of elevation to the east of the second luminance sensing unit 40, the arrangement direction of the beam column 21 is south-north and the width thereof is 10 cm, and the irradiation angle of the sun light is 75°. The computing unit 50 judges that the width of the shadow 22 of the beam column 21 should be smaller than the width of the beam column 21 according to the irradiation angle of the sun light, which is assumed to be 7 cm. At this time, the computing unit computes that the displacement angle of the displacement unit relative to the position determination unit 55 is to move 7 cm to the left.

However, the track is not limited to the above embodiments, and a curved track, an arc-shaped track, a triangular track, a square track, or tracks having other shapes are all applicable.

In addition, the first luminance sensing unit 30, the second luminance sensing unit 40, and the computing unit 50 may also perform data transmission in a wireless mode, which is not limited to a wired mode.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A luminance sensing system, comprising:
a first luminance sensing unit, arranged at a first position, and used for sensing a light ray luminance at the first position to generate a first illumination value;
a second luminance sensing unit, arranged at a second position, having a displacement unit, and used for sensing a light ray luminance at the second position to generate a second illumination value; and
a computing unit, electrically connected to the first luminance sensing unit, the displacement unit, and the second luminance sensing unit, and used for acquiring the first illumination value and the second illumination value, acquiring luminance range information by using the first illumination value, and determining whether the second illumination value conforms to the luminance range information, wherein the computing unit controls the displacement unit to move the second luminance sensing unit when the second illumination value does not conform to the luminance range information.

2. The luminance sensing system according to claim 1, wherein the first position is located outdoors, the second position is located indoors, at least one shading unit is arranged at an indoor top position, and the computing unit computes the luminance range information through a product of the first illumination value, a light transmittance of an indoor material, a light transmittance of a material of each shading unit in a closed status, and an allowable error range value.

3. The luminance sensing system according to claim 1, wherein the displacement unit is arranged on a track, and the computing unit controls displacement of the displacement unit on the track.

4. The luminance sensing system according to claim 1, wherein the computing unit further stores a plurality of pieces of sun light information, each piece of the sun light information comprises a time, sun position information, and sun light angle information, when deciding to control the displacement unit to move, the computing unit finds target sun light information conforming to a corresponding time point from the pieces of the sun light information, and computes displacement information according to the sun position information and the sun light angle information corresponding to the target sun light information, so as to control displacement of the displacement unit according to the displacement information.

5. The luminance sensing system according to claim 4, wherein the computing unit further stores an arrangement direction and a width of a shield corresponding to the second luminance sensing unit, and computes a shadow range of the shield according to the corresponding arrangement direction and width, in combination with the target sun light information, and according to previous displacement information, so as to compute the displacement information.

6. The luminance sensing system according to claim 4, further comprising a position determination unit, arranged at a fixed position corresponding to the displacement unit inside the second position, and used for analyzing a position of the displacement unit or the second luminance sensing unit for generating position information, wherein the computing unit computes the displacement information according to the target sun light information and the position information.

7. The luminance sensing system according to claim 6, wherein the position determination unit is a digital compass, and the displacement information is at least one of a displacement direction, a displacement distance, a positioning point on the track, and a displacement angle corresponding to the position determination unit of the displacement unit.

8. The luminance sensing system according to claim 7, wherein the computing unit further stores a plurality of pieces of pre-stored movement information, each piece of the pre-stored movement information comprises at least one of a displacement direction, a displacement distance, a positioning point on the track, and a displacement angle corresponding to the position determination unit of the second luminance sensing unit, and the computing unit acquires target pre-stored movement information conforming to a corresponding time point from the pieces of the pre-stored movement information to control displacement of the displacement unit.

9. A luminance sensing method, applicable for a first luminance sensing unit arranged at a first position and a second luminance sensing unit arranged at a second position, the method comprising:
sensing, by the first luminance sensing unit, to generate a first illumination value;
acquiring, by a computing unit, luminance range information by using the first illumination value;

sensing, by the second luminance sensing unit, to generate a second illumination;

analyzing, by the computing unit, whether the second illumination value conforms to the luminance range information; and when the second illumination value does not conform to the luminance range information, moving, by the computing unit, the second luminance sensing unit with a displacement unit.

10. The luminance sensing method according to claim 9, wherein the first position is located outdoors, the second position is located indoors, at least one shading unit is arranged at an indoor top position, and the luminance range information is computed through a product of the first illumination value, a light transmittance of an indoor material, a light transmittance of a material of each shading unit in a closed status, and an allowable error range value.

11. The luminance sensing method according to claim 9, wherein the step of moving, by the computing unit, the second luminance sensing unit with the displacement unit further comprises:

arranging a position determination unit at a fixed position corresponding to the displacement unit inside the second position;

analyzing, by the position determination unit, a position of the displacement unit or the second luminance sensing unit for generating position information;

computing, by the computing unit, the displacement information according to the target sun light information and the position information; and controlling displacement of the displacement unit according to the displacement information.

12. The luminance sensing method according to claim 11, wherein the step of moving, by the computing unit, the second luminance sensing unit with the displacement unit further comprises:

providing an arrangement direction and a width of a shield corresponding to the second luminance sensing unit;

computing a shadow range of the shield according to the corresponding arrangement direction and width, in combination with the target sun light information, and according to previous displacement information, so as to compute the displacement information; and controlling the displacement of the second luminance sensing unit according to the displacement information.

13. The luminance sensing method according to claim 11, further comprising:

providing a position determination unit, arranged at a fixed position corresponding to the displacement unit inside the second position, and used for analyzing a position of the second luminance sensing unit for generating position information, wherein the step of moving, by the computing unit, the second luminance sensing unit with the displacement unit comprises: computing the displacement information according to the target sun light information and the position information, and controlling the displacement of the displacement unit according to the displacement information.

14. The luminance sensing method according to claim 9, further comprising:

providing a plurality of pieces of pre-stored movement information, wherein each piece of the pre-stored movement information comprises at least one of a displacement direction, a displacement distance, a positioning point on the track, and a displacement angle corresponding to the position determination unit of the second luminance sensing unit; and finding, by the computing unit, target pre-stored movement information conforming to a corresponding time point from the pieces of the pre-stored movement information, so as to control displacement of the displacement unit.

15. A computer program product, to be read by a computing unit to perform a luminance sensing method, wherein the method is applicable for a first luminance sensing unit arranged at a first position and a second luminance sensing unit arranged at a second position, and the method comprises:

sensing, by the first luminance sensing unit located at the first position, to generate a first illumination value;

acquiring, by a computing unit, luminance range information by using the first illumination value;

sensing, by the second luminance sensing unit located at the second position, to generate a second illumination value;

analyzing, by the computing unit, whether the second illumination value conforms to the luminance range information; and when the second illumination value does not conform to the luminance range information, moving, by the computing unit, the second luminance sensing unit with a displacement unit.

* * * * *